United States Patent
Biondo et al.

(10) Patent No.: US 9,981,186 B1
(45) Date of Patent: May 29, 2018

(54) APPARATUS AND METHOD FOR STARTING RACING

(71) Applicants: Brockmeyer Computer Systems, Inc., Silverthorne, CO (US); Bracketraces.com LLC, Maspeth, NY (US)

(72) Inventors: Peter Biondo, Maspeth, NY (US); Robert Wesley Brockmeyer, Silverthorne, CO (US); Kyle Seipel, Pleasanton, CA (US)

(73) Assignees: Brockmeyer Computer Systems, Inc., Silverthorne, CO (US); BRACKETRACES.COM LLC, Maspeth, NY (US)

( * ) Notice: Subject to any disclaimer, the term of this patent is extended or adjusted under 35 U.S.C. 154(b) by 0 days. days.

(21) Appl. No.: 15/352,350

(22) Filed: Nov. 15, 2016

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| A63F 3/00 | (2006.01) |
| A63B 67/00 | (2006.01) |
| A63B 71/00 | (2006.01) |
| A63F 9/00 | (2006.01) |
| A63F 13/52 | (2014.01) |
| G08G 1/095 | (2006.01) |
| A63F 13/803 | (2014.01) |
| A63F 13/25 | (2014.01) |

(52) U.S. Cl.
CPC .............. *A63F 13/52* (2014.09); *A63F 13/25* (2014.09); *A63F 13/803* (2014.09); *G08G 1/095* (2013.01)

(58) Field of Classification Search
CPC ...................................................... A63F 13/57
See application file for complete search history.

(56) References Cited

U.S. PATENT DOCUMENTS

| | | | | |
|---|---|---|---|---|
| 5,652,468 | A * | 7/1997 | Reid ...................... | B60R 16/03 307/10.1 |
| 2011/0068948 | A1* | 3/2011 | Edmunds ................. | A63K 3/02 340/901 |

* cited by examiner

*Primary Examiner* — Kevin Y Kim
(74) *Attorney, Agent, or Firm* — Keith A. Vogt; Vogt IP

(57) ABSTRACT

The present invention provides method for starting and determining the winner of a staggered race between two racers. The method includes the use of a display having two columns of lights, each column having three countdown lights, a start light and a foul light. A race is started by illuminating the countdown lights on both columns and, upon illumination of the last countdown light, illuminating a first start light for a first driver and illuminating a second start light for the other driver after a predetermined time. In the event of an action that triggers a foul light by the first driver, delaying the illumination of a foul light for the first driver until both racers have started.

8 Claims, 1 Drawing Sheet

US 9,981,186 B1

APPARATUS AND METHOD FOR STARTING RACING

RELATED APPLICATIONS

Not applicable.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Handicap racing is gaining in popularity since it allows cars of different speeds to race one other because the slower car gets a head start. However, handicap racing has an inherent bias against the slower car that starts first. Since part of the skill in racing is to start as soon as the green is shown, racers, in an effort to time the green, often start before the green resulting in a foul which is indicated by a red light on the starting line Christmas tree. In handicap racing, because the slower car is shown the green first, often times when a foul occurs and the red light is shown, the faster car is still waiting to start. Once the second driver sees that a foul has occurred, the incentive to leave as close to green is removed thereby eliminating the possibility of the second driver fouling out. This, in essence, gives the second driver an "easy" win.

BRIEF SUMMARY OF THE INVENTION

In one embodiment, the present invention provides a timing system for use in connection with handicapped racing wherein, if both vehicles false start, the car that false starts by the lower value is deemed the victor.

In other embodiments, the present invention provides a timing system for use in connection with handicapped racing wherein, if one vehicle false starts, neither racer is shown that a false start occurred until both cars have started.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
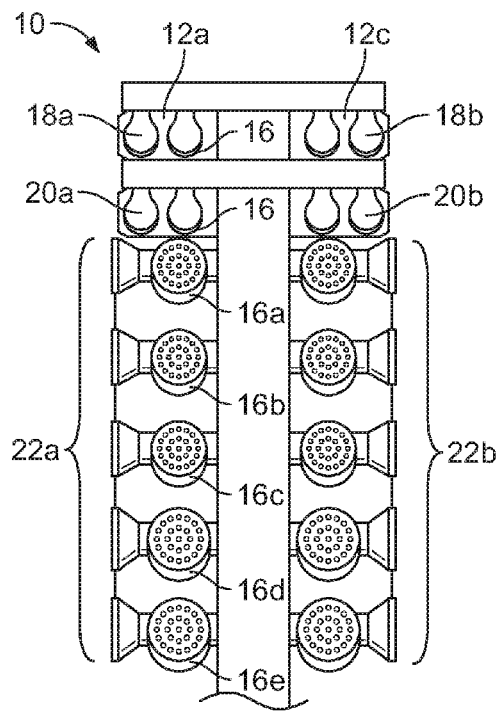
FIG. 1 illustrates a standard starting light used with the present invention.

FIG. 1 illustrates a Christmas tree 10 which is used for starting and timing of drag race events. A common Christmas tree consists of two columns 12a and 12c of seven lights for each driver or lane, as well as a set of light beams across the track itself. Each side of tree, as shown by columns 12a and 12c, has the same arrangement of lights; from the top down. Staging lights 18a and 20a and 18b and 20b are used to position the racers on the starting line. Next, there are three lights 16a-16c, which may be amber in color, followed by a green light 16d. These lights are used to start the race.

Red light 16e is used to indicate an improper start in that a driver left before the green. Column 12c lights 22b are arranged the same as 16a-16e.

Figure 2:
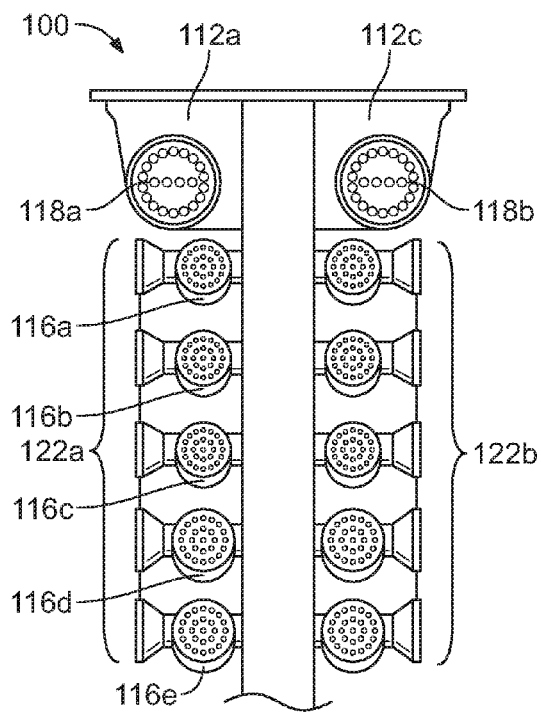
FIG. 2 illustrates a modified standard starting light using Blue LED stage and pre-stage lights that may be used with the present invention.

FIG. 2 illustrates another Christmas tree 100 that may be used with the present invention. Tree 100, as tree 10, is used for starting and timing of drag race events. Christmas tree 100 consists of two columns 112a and 112c of seven lights for each driver or lane, as well as a set of light beams across the track itself. Each side of tree, as shown by columns 112a and 112c, has the same arrangement of lights; from the top down. Staging lights 118a and 118b, which contain a set of horizontal lights and a set of circular lights. Lights 118a and 118b are used to position the racers on the starting line. Next, there are three lights 116a-116c, which may be amber in color, followed by a green light 116d. These lights are used to start the race.

Red light 116e is used to indicate an improper start in that a driver left before the green. Column 112c lights 122b are arranged the same as 116a-16e. In addition to lights, other visual indicators may be used as well.

When drivers are preparing to race, they first cross a beam which is typically 7-inches behind the starting line. Crossing this beam activates lights 18a and 18b. Once pre-staged, drivers roll up another 7-inches and cross the second beam on the line, activating lights 20a and 20b.

After this point, the lighting sequence will be different based on the type of tree and start that a race is using. For a non-handicapped race, the "Standard" tree will light up each amber light 16a-16c consecutively with a predetermined delay in between. Green light 16d is illuminated after another predetermined delay.

On the activation of the green light from either side of tree, the drivers are allowed to start the race. In a handicapped race, a slower car's green will activate for a predetermined time period before the faster car's green activates. Because the starting times are staggered, the faster car is at an advantage to benefit from an "easy" win. For example, since the slower car is the first to start, if it false starts or fouls out, a red will be shown to the driver as well as to the competitor in the faster car. To win the race at this point, the faster car has no incentive to start as soon as possible, and may simply avoid false starting by waiting for the second green to be clearly shown before starting.

To eliminate the unfair advantage, the current systems awards to the faster driver, in one embodiment, the present invention provides a system and method wherein a green light or other indicator to start the race will be shown to the first driver, regardless if a foul is committed by the first driver. In yet another embodiment of the present invention, once the second driver takes the start, if one driver jumped the start or fouled, then that driver's lane will display the red light indicating or other indicator that a foul has occurred. In yet another embodiment, the green light or start indicator is used to indicate the winner of the race.

In yet another embodiment of the present invention, a system and method is provided wherein no start light or indicator is provided to either driver. Once the second driver takes the start, if one driver jumped the start, then that driver's lane may display the red or foul light or indicator. In yet another embodiment, the green light or start indicator is used to indicate the winner of the race.

In yet another embodiment of the present invention, if both drivers jump, only the driver whose infraction was worse will be shown the red light, as if it was a heads-up start. In still a further embodiment, a win light is not displayed until both drivers leave the starting line. In yet another embodiment, if both drivers have a foul start, both foul or red lights are shown (one in each lane). In this situation the winning lane/driver may be shown by the "Win-Light" that is then shown on the scoreboards.

In yet another embodiment of the present invention, the present invention provides a method and device that provides a virtual handicap race. In one embodiment, the present invention provides a portable Christmas tree, which may be a desk top or hand held model, that contains a processor and software that simulates an actual race. This embodiment allows a user to train as if they are either the slower or faster car. The operation of light sequencing for this embodiment is as described above.

In yet another embodiment of the present invention, the present invention provides a method and device that provides a virtual handicap race that may be run by racers in different locations. In this embodiment, the present invention provides one or more portable Christmas trees which are adapted to link to a network such as the Internet. The remote units contain a processor and software and are configured to cooperate with a central server to simulate an actual race. The operation of light sequencing for this embodiment is as described above.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method for starting a race between two racers comprising the steps of:
    providing a display, said display having two columns of indicators, each column having one or more countdown indicators, a start indicator and a foul indicator;
    starting a race by illuminating said one or more countdown indicators;
    upon illumination of the last countdown indicator, illuminating said start indicator for each racer; and
    in the event of a foul by a racer, delaying the illumination of said foul indicator until both racers have started.

2. A method for starting and determining the winner of a staggered race between two racers comprising the steps of:
    providing a display, said display having two columns of indicators, each column having one or more countdown indicators and a foul indicator;
    starting a race by illuminating said one or more countdown indicators on both columns;
    delaying the illumination of the last countdown indicator for a second racer for a predetermined time after the illumination of the last countdown indicator for a first racer; and
    in the event of a foul by said first racer, delaying the illumination of said foul indicator for the first racer until both racers have started.

3. The method of claim 1 wherein if both racers trigger a foul indicator by starting before their respective start indicator is illuminated, determining the winner by calculating the racer that starts closest to the start indicator.

4. The method of claim 2 wherein if both racers trigger a foul, determining the winner by calculating the racer that starts closest to a start assigned to each racer.

5. The method of claim 3 wherein only the losing racer will be shown the foul indicator.

6. The method of claim 4 wherein only the losing racer will be shown the foul indicator.

7. A method for simulating a staggered race comprising the steps of:
    providing a display, said display having two columns of indicators, each column having three countdown indicators, a start indicator and a foul indicator;
    starting a race by illuminating said countdown indicators on both columns;
    upon illumination of the last countdown indicator, illuminating a first start indicator and illuminating a second start indicator after a predetermined time; and
    in the event of a foul, delaying the illumination of said foul indicator until all starts are indicated.

8. The method of claim 7, wherein the simulated race is between two remotely located participants and a plurality of displays are provided.

* * * * *